(12) United States Patent
Yuan

(10) Patent No.: US 6,848,751 B1
(45) Date of Patent: Feb. 1, 2005

(54) NON-ROTATIONAL EMBLEM MEANS AS CONSTANTLY UPRIGHT-ORIENTED ON WHEEL DISC

(76) Inventor: Wen Jen Yuan, 3840 Mission View Dr., Fremont, CA (US) 94538

( * ) Notice: Subject to any disclaimer, the term of this patent is extended or adjusted under 35 U.S.C. 154(b) by 0 days.

(21) Appl. No.: 10/666,405

(22) Filed: Sep. 15, 2003

(51) Int. Cl.$^7$ .................................................. B60B 7/20
(52) U.S. Cl. ............................. 301/37.25; 301/37.107; 40/587
(58) Field of Search ........................ 301/37.25, 37.101, 301/37.105, 37.108, 37.23, 111.03, 108.1, 111.07, 37.37, 37.26, 37.109; 40/587, 591

(56) References Cited

U.S. PATENT DOCUMENTS

| | | | | |
|---|---|---|---|---|
| 2,166,048 A | * | 7/1939 | Fritsch | 40/591 |
| 3,918,186 A | * | 11/1975 | Gray | 40/591 |
| 4,388,771 A | * | 6/1983 | Lalonde | 410/587 |
| 5,316,376 A | * | 5/1994 | Defreitas | 301/37.26 |
| 5,588,715 A | * | 12/1996 | Harlen | 301/37.25 |
| 6,536,848 B1 | * | 3/2003 | Goodman | 301/37.25 |
| 6,568,110 B2 | * | 5/2003 | Lee et al. | 40/587 |
| 6,637,831 B1 | * | 10/2003 | Kim | 301/37.25 |

* cited by examiner

Primary Examiner—Frantz F. Jules

(57) ABSTRACT

An emblem device includes: a housing secured in a central (axial) portion of a wheel disc of a car wheel; and a decorative member having decorative feature or logo formed thereon and rotatably coupling with the housing and having a pendulum weight formed in a lower portion of the decorative member to be gravitationally pendent constantly; whereby upon a rotation of the car wheel to simultaneously rotate the housing secured on the wheel disc, the decorative member will be positioned or oriented upright constantly relative to th rotation of car wheel to thereby display the decorative feature upright, clearly and observably.

3 Claims, 3 Drawing Sheets

NON-ROTATIONAL EMBLEM MEANS AS CONSTANTLY UPRIGHT-ORIENTED ON WHEEL DISC

BACKGROUND OF THE INVENTION

U.S. Pat. No. 5,188,429 to Heck disclosed a fabricated wheel having a radially inwardly extending disc face. In such a prior art, a central cap (44) is secured in the disc face for completing the wheel having decorative feature or logo formed thereon. However, the logo or decorative feature formed on the disc face is simultaneously rotated along with the rotation of the car wheel, thereby making the decorative feature unobservable or unclearly.

The present inventor has found the drawbacks of the prior art and invented the present emblem device which is always upright positioned for a clear observing even the car is running.

SUMMARY OF THE INVENTION

The object of the present invention is to provide an emblem device including: a housing secured in a central (axial) portion of a wheel disc of a car wheel; and a decorative member having decorative feature or logo formed thereon and rotatably coupling with the housing and having a pendulum weight formed in a lower portion of the decorative member to be gravitationally pendent constantly; whereby upon a rotation of the car wheel to simultaneously rotate the housing secured on the wheel disc, the decorative member will be positioned or oriented upright constantly relative to the rotation of car wheel to thereby display the decorative feature upright, clearly and observably.

DETAILED DESCRIPTION

Figure 1:
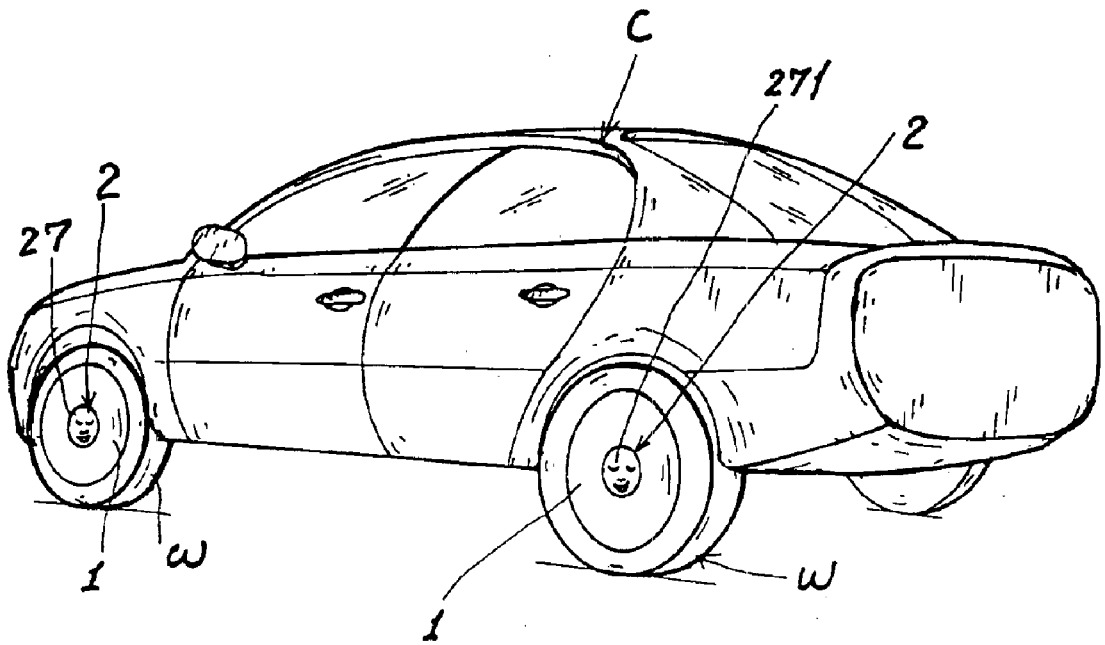
FIG. 1 is an illustration showing a car implemented with the present invention.
Figure 2:
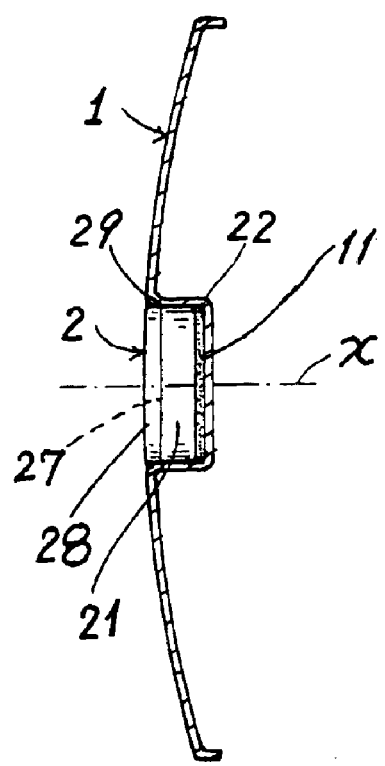
FIG. 2 is a partial sectional drawing of the present invention.
Figure 3:
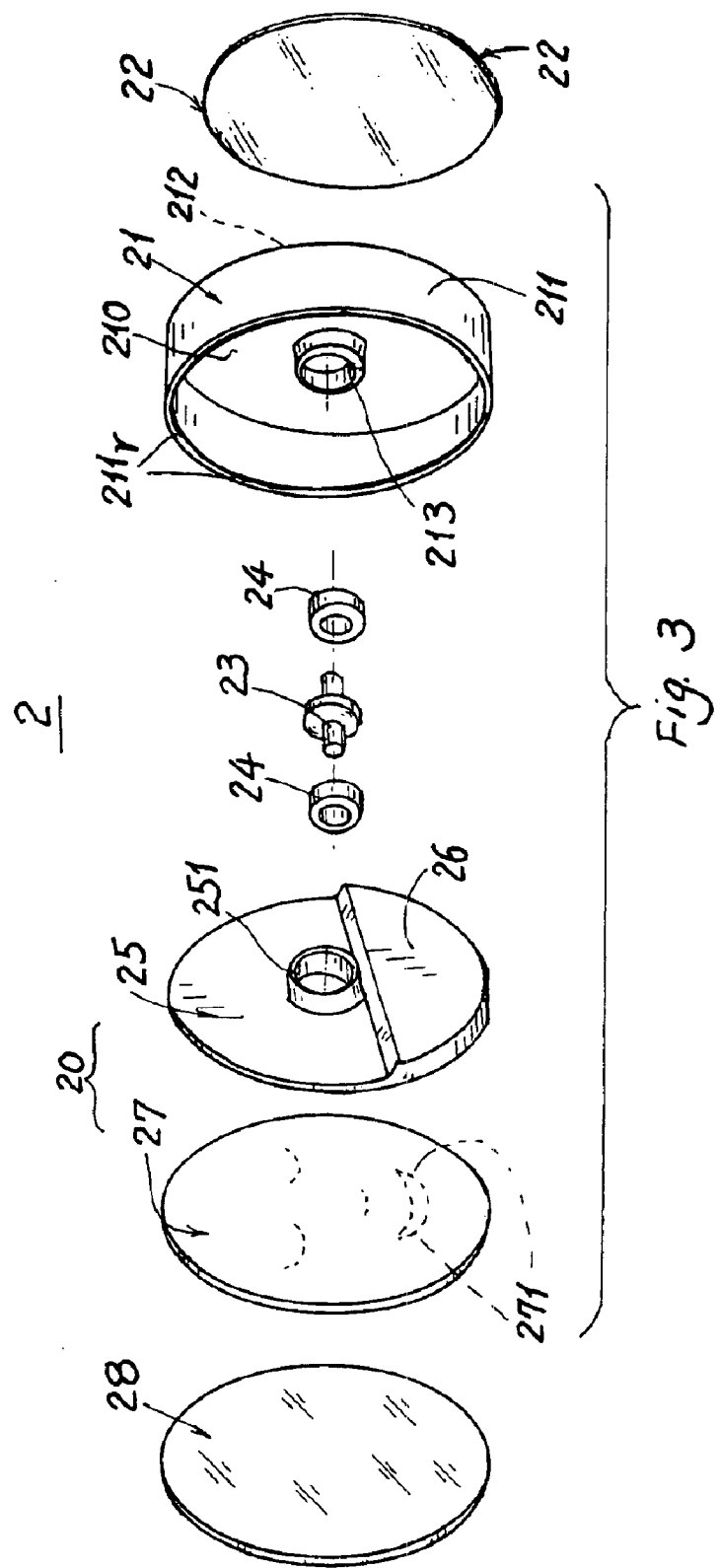
FIG. 3 is an exploded view showing th elements of the present invention.

As shown in FIGS. 1~4, the emblem means of the present invention comprises: a housing 21 secured in a central (axial) portion 11 of a wheel disc 1 of a car wheel W (as shown on the car C in FIG. 1), a rotating disk 25 rotatably mounted in (or coupled with) the housing 21 about a shaft 23 and a set of bearings 24, a pendulum weight (or weight) 26 formed on (or in) a lower portion of the rotating disk 25, a decorative piece 27 having decorative feature 271 formed thereon fixed on a front surface portion of the rotating disk 25, and a transparent cover 28 combined with the housing 21 to encase the rotating disk 25 and the decorative piece 27 within the housing 21.

The decorative piece 27 may be formed thereon with any decorative feature 271 including: logo, trademark, design, emblem feature, words or figures or any other personal favorites, not limited in the present invention.

The decorative piece 27 may be formed as a sticker adhered on a front surface of the rotating disk 25; or the decorative piece 27 is simplified by directly printing or forming the decorative features 271 on a clear front surface of the rotating disk 25, which may be modified by those skilled in the art.

The decorative piece 27 and the rotating disk 25 may also be integrally formed as a decorative rotating disk 20, if provided for mass production for a famous brand or logo, for instance.

The shaft 23 with bearings 24 provided for rotatably coupling or engaging the rotating disk 25 with the housing 21 define an axis X about the shaft center which is coaxial to an axis of a wheel axle (not shown) of the car C of the present invention.

The wheel disc 1 is formed a recess 11 at a central (axial) portion of the disc 1 for embedding the housing 21 in the recess 11. An adhesive layer 22, such as a double-face adhesive tape, may be provided to adhere a back (or bottom) portion 212 of the housing 21 to a bottom of the recess 11.

The housing 21 is preferably formed as a cylindrical shape having a cylindrical wall 211 formed on a housing bottom 212, a bushing 213 formed in a central portion of the housing bottom 212 for engaging a bearing 24 therein for rotatably mounting the shaft 23, and a front rim 211r which is provided for combining the transparent cover 28 (FIG. 4) to encase the rotating disk 25, the decorative piece 27 within an interior 210 confined by the housing 21 and the cover 28.

Figure 4:
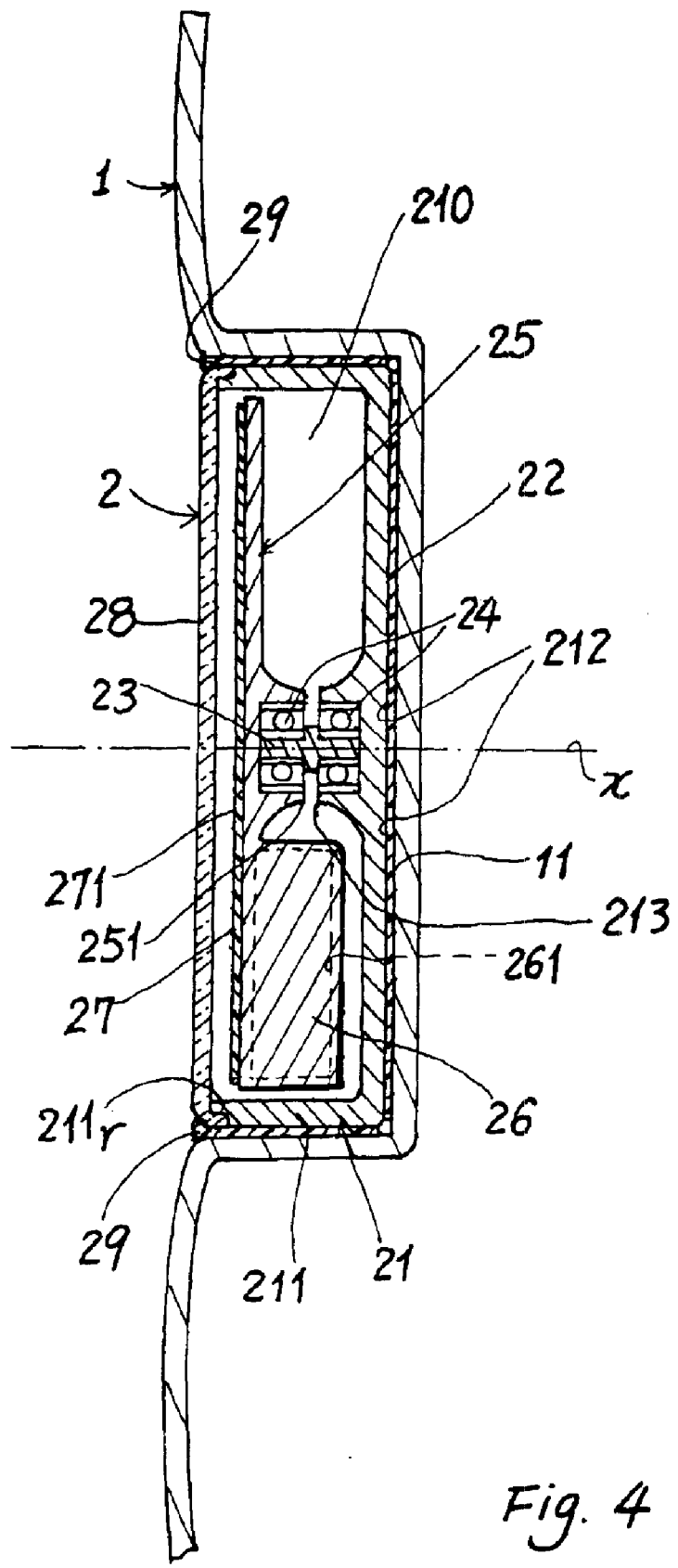
FIG. 4 is a sectional drawing of the present invention when enlarged from FIG. 2.

For well fastening of the housing 21 in the recess 11 of the wheel disc 1, a packing or sealant 29 is provided to firmly fasten the housing 21 in the recess 11 (FIG. 4).

The pendulum weight (or weight) 26 may be integrally formed with the rotating disk 25; or a hollow portion (as numeral "261" as shown in FIG. 4) is formed in a convex portion formed on a lower portion of the rotating disk 25 and is filled with liquid or filler in the hollow portion 261 to serve as the pendulum weight.

For example, water or sand may be filled into the hollow portion 261 of the convex portion formed on the lower portion of the rotating disk 25 to form the pendulum weight 26 in accordance with the present invention.

When the car is driving and the wheel is rotating, the housing 21 of the present invention will be simultaneously coaxially rotated with the wheel W about the axis X. However, the disk 25 is gravitationally pendent (relative to the rotation of housing 21) as effected by the pendulum weight 26 formed on the lower portion of the rotating disk 25. The gravitational force of the weight 26 is constantly greater than the frictional force between the bearing 24 and the disk bushing 251 to ensure the constant upright position of the decorative piece 27 of the present invention during the rotation of housing 21 and car wheel. Therefore, the decorative feature 271 as formed on the rotating disk 25 will not be rotated along with the rotation of wheel and will be constantly upright positioned to have a clear view on the decorative feature 271.

The present invention can thus provide a clear observation with upright or erect image (feature or figure) on the wheel disc, without being simultaneously rotated along with the rotation of the car wheel. Accordingly, a decorative feature for advertising or display purpose or even for personal favorite reason can be vividly achieved.

The present invention is superior to any conventional logo device on a wheel disc.

The present invention may be modified without departing from the spirit and scope of the present invention. Several elements including cover 28 and decorative piece 27 may be detachably mounted with the housing 21 for replacement purpose.

I claim:

1. An emblem means comprising:

a housing secured in a recess formed in a central portion of a wheel disc of a car wheel;

a rotating disk rotatably coupled with said housing about a shaft formed in a central axial portion of said housing, with said shaft having an axis defined at a shaft center and coaxially aligning with an axle axis of the car wheel;

a pendulum weight formed on a lower portion of said rotating disk; and a decorative feature including emblem, logo, trademark, figure and design formed on a front surface of said rotating disk;

said housing formed as a cylindrical shape having a cylindrical wall formed on a housing bottom, a bushing formed in a central portion of the housing for engaging a bearing in said bushing for rotatably mounting the shaft therein, and a front rim which is combined with a transparent cover to encase the rotating disk and the decorative feature within an interior confined by the housing and the cover;

whereby upon rotation of said housing along with the rotation of the car wheel when driving a car, said rotating disk is gravitationally pendent to constantly orient said decorative feature in an upright position for a clear display thereof without being simultaneously rotated with the car wheel and the housing.

2. An emblem means according to claim 1, wherein said housing further includes an adhesive layer formed on a back portion of the housing to be adhered to a bottom of the recess.

3. An emblem means according to claim 1, housing further includes a sealant provided to firmly fasten the housing in said recess formed in said wheel disc.

* * * * *